(12) United States Patent
Andrä et al.

(10) Patent No.: US 6,315,670 B1
(45) Date of Patent: Nov. 13, 2001

(54) ELASTIC ARTICULATED BODY

(75) Inventors: Rainer Andrä, Limburg; Wilfried Schneider, Waldkraiburg; Georg Maierbacher, Kirchdorf/Haag, all of (DE)

(73) Assignee: SGF Suddeutsche Gelenkscheibenfabrik GmbH & Co. KG (DE)

( * ) Notice: Subject to any disclaimer, the term of this patent is extended or adjusted under 35 U.S.C. 154(b) by 0 days.

(21) Appl. No.: 09/508,415

(22) PCT Filed: Sep. 21, 1998

(86) PCT No.: PCT/EP98/06007

§ 371 Date: Mar. 13, 2000

§ 102(e) Date: Mar. 13, 2000

(87) PCT Pub. No.: WO99/15803

PCT Pub. Date: Apr. 1, 1999

(30) Foreign Application Priority Data

Sep. 25, 1997 (DE) .............................. 197 42 361

(51) Int. Cl.[7] ........................................ F16D 3/62
(52) U.S. Cl. ................................ 464/69; 464/93
(58) Field of Search ................ 464/69, 71, 72, 464/93, 94, 95, 137

(56) References Cited

U.S. PATENT DOCUMENTS

| | | | |
|---|---|---|---|
| 1,531,999 | * 3/1925 | Stokes | 464/94 |
| 1,759,356 | 5/1930 | Kattwinkel . | |
| 3,668,891 | 6/1972 | Brizzolesi . | |
| 4,226,381 | 10/1980 | Katata . | |
| 4,682,901 | 7/1987 | Hauber . | |
| 4,768,992 | * 9/1988 | Mancuso et al. | 464/69 |
| 4,846,761 | * 7/1989 | Weiss | 464/69 |
| 5,286,231 | * 2/1994 | Zilberman et al. | 464/93 |
| 6,167,782 | * 1/2001 | Chevalier | 74/574 |

FOREIGN PATENT DOCUMENTS

| | | | |
|---|---|---|---|
| 274957 | 7/1951 | (CH) . | |
| 1688879 | 9/1954 | (DE) . | |
| 2 353 303 | 5/1974 | (DE) . | |
| 3734089 | 6/1988 | (DE) . | |
| 3942432 | 5/1991 | (DE) . | |
| 9017209 | 7/1991 | (DE) . | |
| 4304274 | 3/1994 | (DE) . | |
| 9420256 | 3/1995 | (DE) . | |
| 19742359 | 4/1999 | (DE) . | |
| 26 09 880-A1 | * 9/1977 | (DE) | 464/69 |
| 837 975 | 5/1939 | (FR) . | |
| 546351 | 7/1972 | (GB) . | |
| 580901 | * 9/1946 | (GB) | 464/93 |

* cited by examiner

Primary Examiner—Lynne H. Browne
Assistant Examiner—Greg Binda
(74) Attorney, Agent, or Firm—Webb Ziesenheim Logsdon Orkin & Hanson, P.C.

(57) ABSTRACT

A joint body includes at least one loop package and collar bushings each having a bushing member and a first collar formed integrally thereon. The bushing members of the collar bushings are passed through the loop package, and the collars thereof axially support a first loop package side. A second collar axially supports a second loop package side and is axially joined with each bushing member. The collar bushing has at an end of the bushing member remote from the first collar a radial outer catching arrangement. A radial inner catching arrangement is provided on the second collar which forms a snap connection together with the radial outer catching arrangement. The loop package is at least partially embedded in a rubber elastic jacket.

19 Claims, 6 Drawing Sheets

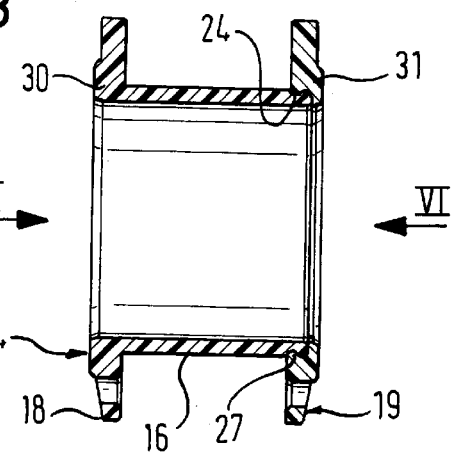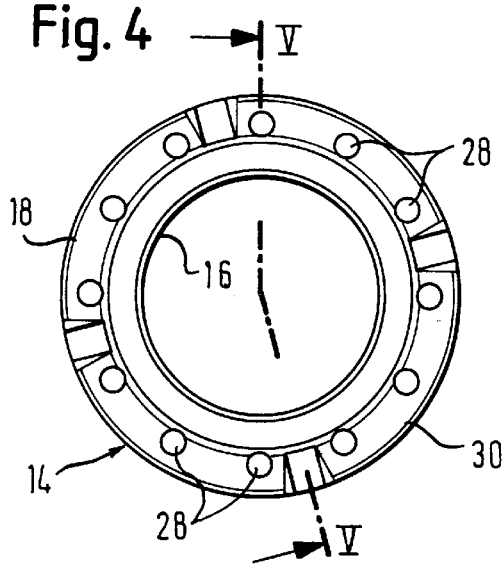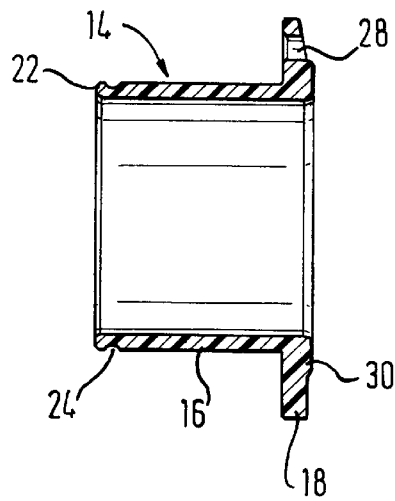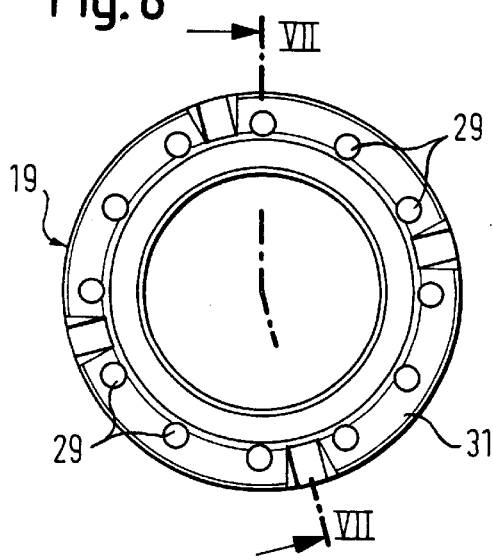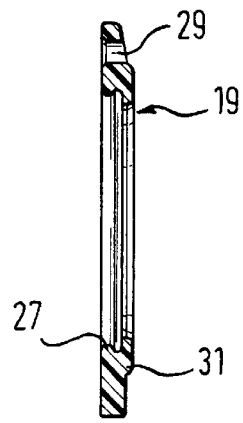

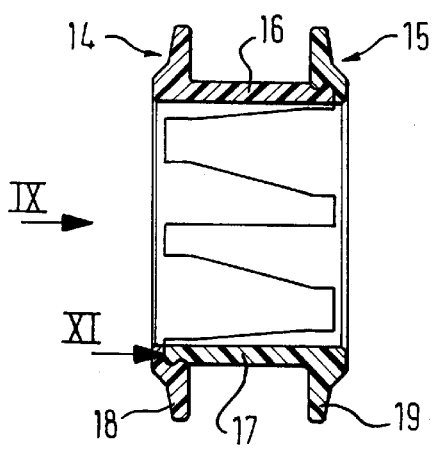
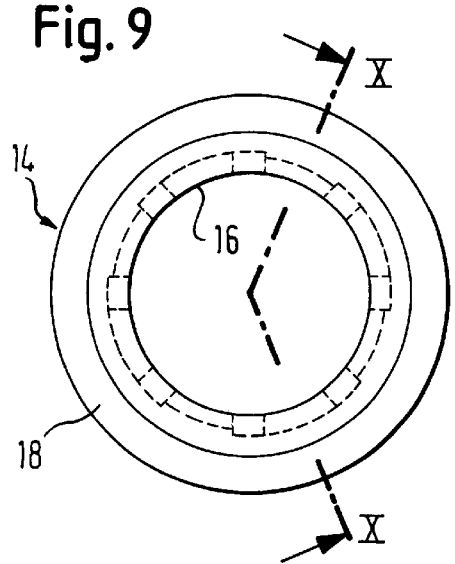
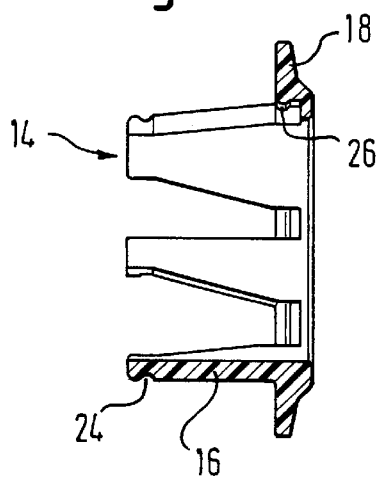
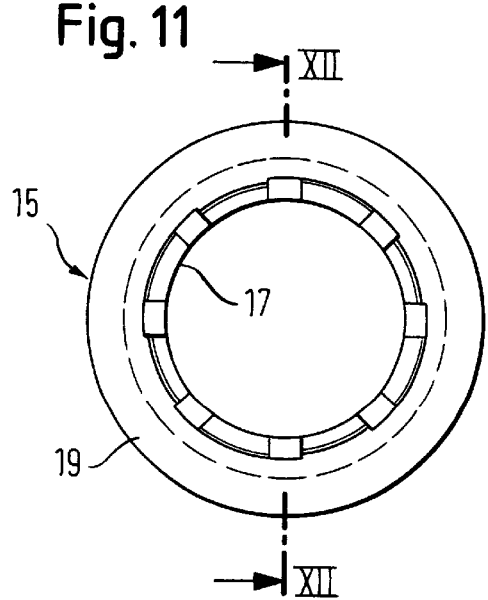
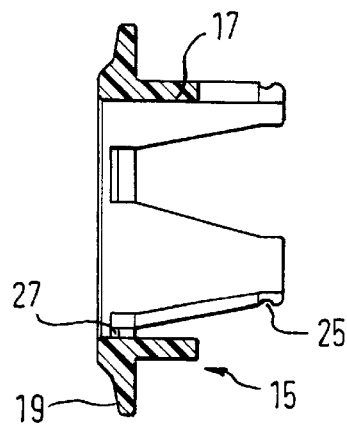

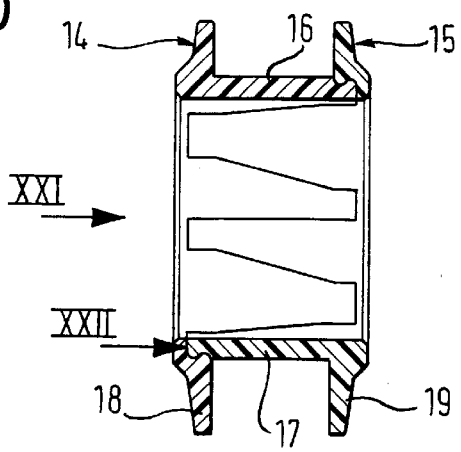
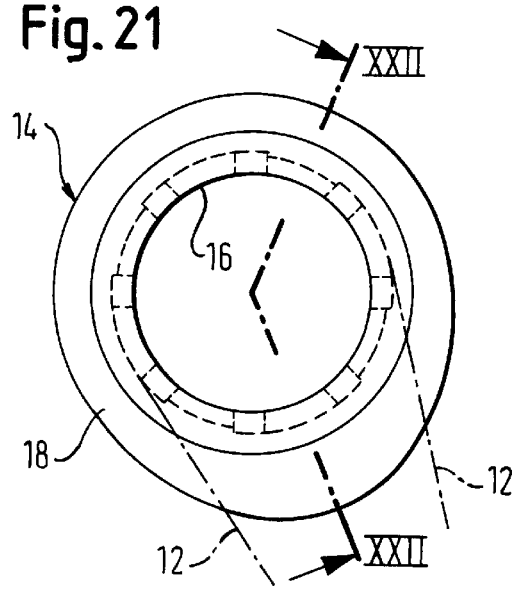
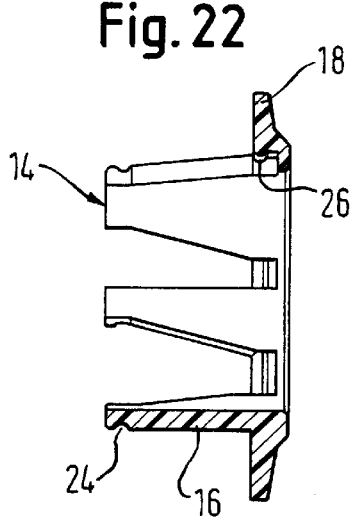
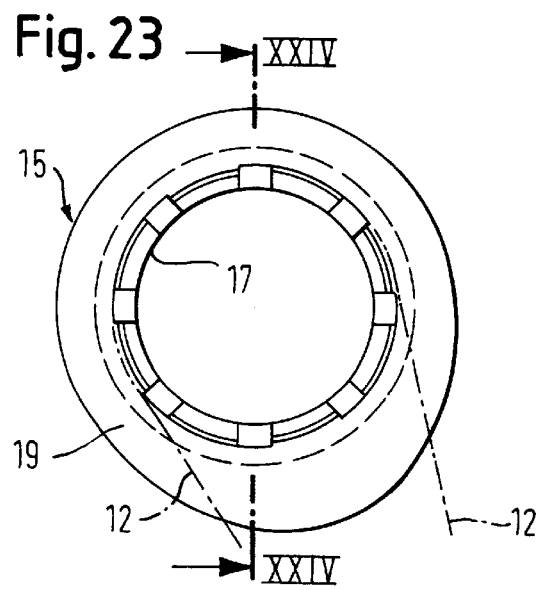
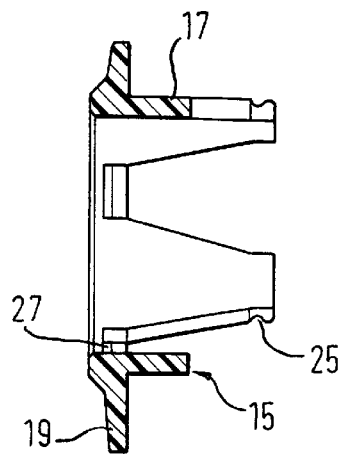

ELASTIC ARTICULATED BODY

BACKGROUND OF THE INVENTION

1. Field of the Invention

The present invention relates to elastic joint body having at least one loop package;

collar bushings each of which includes a bushing member and a first collar integrally formed thereon, is passed with its bushing member through the loop package and supports with its collar a first loop package side axially;

a second collar which is axially joined with the bushing member and supports a second loop package side axially; and a rubber elastic jacket in which the loop package is embedded at least partially.

2. Description of the Prior Art

Elastic joint bodies are commonly used, for example in the form of flexible disks, for the cardanic connection of shafts, especially in the drive shaft of motor vehicles. When assembling such joint bodies, the collar bushings are fastened to shaft flanges or the like by means of threaded bolts rivets or the like passed through the collar bushings.

In a joint body of the type mentioned above, which is known from DEU-1 688 879, four loop packages are arranged around a central opening in the joint body, overlapping each other in pairs, so that they form a wreath closed in itself. A pair of collar bushings is arranged in each of the overlapping regions, each of which has a circular collar and a cylindrical bushing member and which are axially joined from both sides in such a manner that the bushing members engage each other over their entire length. A reliable axial positioning of the loop packages depends on the diameters of the two bushing members being adapted in such a manner that they fit into each other tightly. This prerequisite can not or only with considerable expenditure be fulfilled in mass production. In any event, the duplication of the bushing members involves an additional expenditure of material and first of all requires space which could better be used to accommodate stronger loop packages.

For axially fixing the loop packages to vulcanize the jacket and for guiding them in operation with less material expenditure, elastic joint bodies in the form of flexible disks having several overlapping loop packages were provided, accord ing to DE-C-39 42 432, for example, with smooth cylindrical bushings which extend through the regions of overlap and onto the ends of which a collar bushing each for axially positioning the loop packages is pressed. The collar bushings belonging together in pairs are thus kept at a predetermined distance from and in axial alignment with each other.

According to DE-C-43 04 274, ring discs are pressed onto the two ends of the through bushing instead of the collar bushings, the rings discs having radially inwardly projecting teeth digging into the through bushing. This reduces the space required by the arrangement for axially positioning the loop packages even further. However, pressing the toothed ring discs onto an end of an axial through bushing each requires, like the pressing of collar bushings, considerable force that has to be applied by means of a device adjustable in such a manner that the axial space provided for the loop packages between oppositely arranged collars is exactly observed. These prerequisites cannot be fulfilled easily by a rapidly working automatic assembly machine.

In a similar manner is a spool known from DE-U-94 20 256 composed of a tubular spool core and two spool flanges which engage with a ring land each in a face edge of the spool core each and are interlocked with the same. The two face edges of the spool core are to this end provided with radially inwardly projecting catch lands having serrated profiles, and the ring lands of the spool flanges have corresponding catching profiles which encompass the catch lands of the spool core radially inwardly and lock axially behind them. These known spools are not provided and not suited either to be used as bushings for joint bodies of the type described initially, because the snap connections arranged radially within the spool core would hinder and/or as a result be destroyed when the joint body is mounted by means of threaded bolts, rivets or the like.

U.S. Pat. No. 4,682,901 discloses a ball bearing arrangement whose main components are an outer ring and an inner ring which in turn is composed of a first and a second inner ring section. The outer ring and the joined inner ring define between them a ball race in which the individual balls are held. Both inner ring sections comprise a collar each; the outer ring is arranged between said two collars in such a manner that it cannot move axially. The first inner ring section moreover comprises a bushing member extending away from a ring-shaped, axially inner shoulder of the first ring section. A radially outer ring rib is formed in the middle of the bushing member which is snapped into a corresponding ring groove in the middle of the second inner ring section. This means that the ring rib and the ring groove together form a snap-in connection. This holds the two inner ring sections together in such a manner that, jointly, they form the radially inner part of the ball race.

It is, therefore, the object of the invention to simplify the manufacture of elastic joint bodies comprising at least one loop package fixed in its axial position.

Embodiments of the invention are described in greater detail in the following detailed description, in conjunction with the drawings.

BRIEF DESCRIPTION OF THE DRAWINGS

FIG. 3 is an axial section view of a bushing arrangement according to FIG. 2, but at an enlarged scale;

FIG. 4 is a side view of a collar bushing belonging to the bushing arrangement according to arrow IV in FIG. 3;

FIG. 5 is an axial section view along lines V—V in FIG. 4;

FIG. 6 is a side view of a collar belonging to the bushing arrangement according to arrow VI in FIG. 3;

FIG. 7 is an axial section view along lines VII—VII in FIG. 6; and

FIG. 8 shows an alternative bushing arrangement in an axial section view corresponding to FIG. 3;

FIG. 9 is a side view of a collar bushing belonging to the alternative bushing arrangement according to arrow IX in FIG. 8;

FIG. 10 is an axial section view along lines X—X in FIG. 9;

FIG. 11 is an the side view of another collar bushing belonging to the alternative bushing arrangement according to arrow XI in FIG. 8;

FIG. 12 is an axial section view along line XII—XII in FIG. 11;

FIG. 20 shows an alternative bushing arrangement in an axial section corresponding to FIG. 8;

FIG. 21 shows a side view of a collar bushing belonging to the bushing arrangement according to arrow XXI in FIG. 9;

FIG. 22 shows an axial section XXII—XXII of FIG. 21;

FIG. 23 shows a side view of a collar belonging to the same bushing arrangement according to arrow XXII of FIG. 20; and FIG. 24 shows an axial section XXIV—XXIV of FIG. 23.

DETAILED DESCRIPTION OF THE PREFERRED EMBODIMENTS

Figure 1:
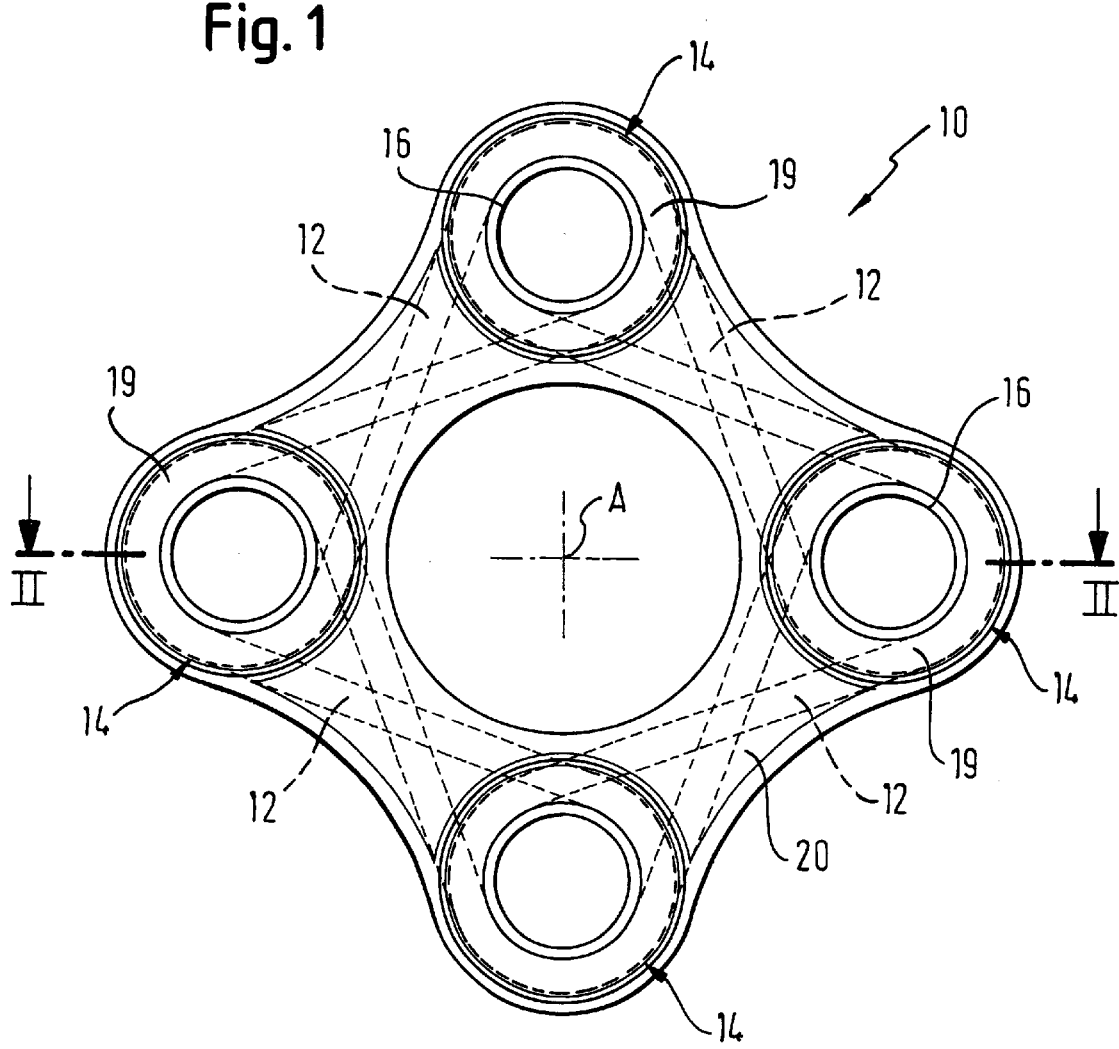
FIG. 1 is a side view of a joint body according to the invention.
Figure 2:
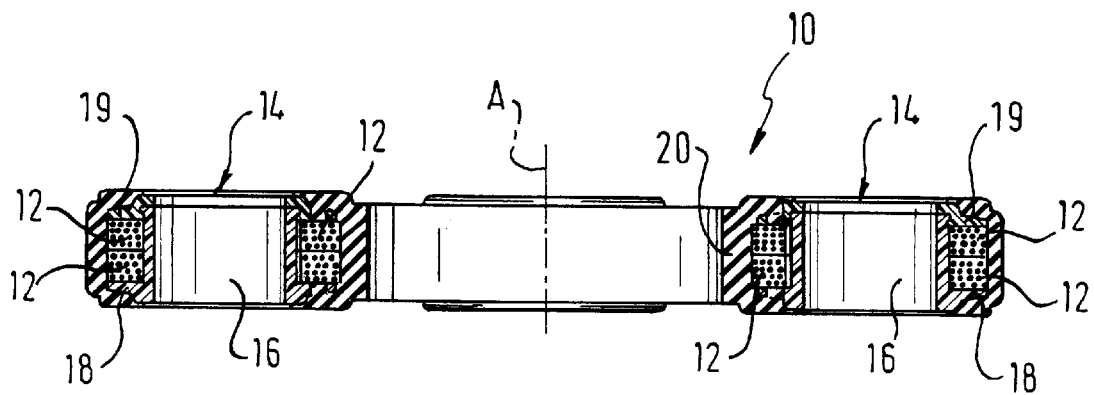
FIG. 2 is a section view along lines II—II in FIG. 1.

FIGS. 1 and 2 illustrate a joint body 10 which is intended to connect two steering spindle sections of a motor vehicle so as to be movable in cardanic fashion, for example. The joint body 10 comprises four oblong loop packages 12 each of which was in a conventional manner wound from filaments or wire to the shape of an 8. Two each of said loop packages 12 overlap and form in the area of overlap a through hole which extends parallelly to the axis A of the joint body 10 and through which a collar bushing 14 is passed with a substantially cylindrical bushing member 16 formed thereon.

What is claimed is:

1. An elastic joint body, comprising:
   at least one loop package;
   a plurality of collar bushings each of which includes a bushing member and a first collar integrally formed thereon, wherein each of the collar bushings is passed with the bushing member through the loop package and axially supports with the first collar a first loop package side;
   a second collar axially joined with the bushing member and axially supporting a second loop package side; and
   a rubber elastic jacket in which the loop package is embedded at least partially,
   wherein each of the collar bushings has at an end of the bushing member remote from the first collar a radially outer catching means,
   wherein a radially inner catching means is provided on the second collar, which forms a snap connection together with the radially outer catching means,
   wherein the first and second collars each include an abutment ring projecting in an axial direction for positioning the joint body in a mold for vulcanizing the jacket, and
   wherein the abutment ring of the second collar covers in the axial direction the end of the bushing member averted from the first collar of the bushing member which is integral with the first collar.

2. The elastic joint body according to claim 1, wherein the radially outer catching means is a snap-in depression having the shape of an outer annular groove, and wherein the radially inner catching means is an annular snap-in protrusion.

3. The elastic joint body according to claim 2, wherein the collar bushings and the first and second collars are injection molded from synthetic material.

4. The elastic joint body according to claim 2, wherein the snap connection is secured by one of conglutination and bonding.

5. The elastic joint body according to claim 2, wherein the first and second collars are at least one of long stretched out and eccentric in accordance with the lengthwise direction of the loop package the first and second collars support.

6. The elastic joint body according to claim 1, wherein the second collar is integrally formed on a second collar bushing, and wherein the bushing members each have a crown-shaped configuration and are joined axially such that the respective bushing members extend up to the collar of the other respective collar bushing and forms a snap connection with the same.

7. The elastic joint body according to claim 6, wherein the collar bushings and the first and second collars are injection molded from synthetic material.

8. The elastic joint body according to claim 6, wherein the snap connection is secured by one of conglutination and bonding.

9. The elastic joint body according to claim 6, wherein the first and second collars are at least one of long stretched out and eccentric in accordance with the lengthwise direction of the loop package the first and second collars support.

10. The elastic joint body according to claim 9, wherein the collar bushings and the first and second collars are injection molded from synthetic material.

11. The elastic joint body according to claim 10, wherein the first and second collars are interconnected by a resilient bracket formed integrally with the first and second collars, and wherein the bracket is positioned around the at least one loop package.

12. The elastic joint body according to claim 11, wherein the snap connection is secured by one of conglutination and bonding.

13. The elastic joint body according to claim 11, wherein the first and second collars are at least one of long stretched out and eccentric in accordance with the lengthwise direction of the loop package the first and second collars support.

14. The elastic joint body according to claim 10, wherein the snap connection is secured by one of conglutination and bonding.

15. The elastic joint body according to claim 10, wherein the first and second collars are at least one of long stretched out and eccentric in accordance with the lengthwise direction of the loop package the first and second collars support.

16. The elastic joint body according to claim 10, wherein the synthetic material is polyamide.

17. The elastic joint body according to claim 1, wherein the snap connection is secured by one of conglutination and bonding.

18. The elastic joint body according to claim 17, wherein the first and second collars are at least one of long stretched out and eccentric in accordance with the lengthwise direction of the loop package the first and second collars support.

19. The elastic joint body according to claim 1, wherein the first and second collars are at least one of long stretched out and eccentric in accordance with the lengthwise direction of the loop package the first and second collars support.

* * * * *

UNITED STATES PATENT AND TRADEMARK OFFICE
CERTIFICATE OF CORRECTION

PATENT NO. : 6,315,670 B1
DATED : November 13, 2001
INVENTOR(S) : Rainer Andrä et al.

It is certified that error appears in the above-identified patent and that said Letters Patent is hereby corrected as shown below:

Column 2,
Line 57, "an the side" should read -- a side --.

Column 3,
After line 35 insert the following paragraphs:
-- Each of the collar bushings 14 comprises a first collar 18 which is manufactured integrally with the bushing member 16 and projects radially outwardly from the same. The collar bushings 14 with their bushing members 16 and collars 18 are preferably injection molded from synthetic material, e.g. polyamide. A second collar 19 manufactured separately and preferably also injeciton molded from polyamide is mounted to each of the collar bushings 14 in such a manner that the areas of overlap of the associated loop packages 12 are received between the first collar 18 and the second collar 19 and secured against axial movement. In all the illustrated embodiments the collars 19 have, in side view, the shape of a circular ring and are coaxial with the bushing member 16. But the collars 18 and 19 may also be arranged eccentrically or have an oblong configuration; embodiments of such arrangement and configurations are illustrated and described in DE-A-197 42 359.0-12.

Finally, the joint body 10 comprises a rubber-elastic jacket 20 into which the loop packages 12, the bushing members 16 with their integrally formed first collars 18, as well as the second collars 19 are vulcanized after the collar bushings 14 were joined with the associated second collar 19 to form complete busing arrangement.

Figs. 3 to 7 show one of the bushing arrangements illustrated in Figs. 1 and 2 comprised of an integrally manufactured collar bushing 14 and a second collar 19 mounted thereto and manufactured separately. The collar bushing 14 is provided with a snap-in depression 24 embodied by an outer annular groove on the annular end 22 of its bushing member 16 remote from the first collar 18. On the radial inner side of the second collar 18, an annular snap-in protrusion 27 is provided which forms a snap connection together with the snap-in depression 24. This is effected in that the second collar 19 is moved onto the end 22 of the bushing member 16 with moderate force until the snap-in protrusion 27 according to Fig. 3 has snapped into the snap-in depression 24.

UNITED STATES PATENT AND TRADEMARK OFFICE
CERTIFICATE OF CORRECTION

PATENT NO. : 6,315,670 B1
DATED : November 13, 2001
INVENTOR(S) : Rainer Andrä et al.

It is certified that error appears in the above-identified patent and that said Letters Patent is hereby corrected as shown below:

Two collars 18 and 19 are provided with holes 28 and 29, respectively, into which the rubber elastic jacket 20 penetrates during vulcanization, so that the collars are anchored securely. An axially projecting abutment ring 30 and 31, respectively, each is formed on the axial outer side of each of the collars 18 and 19 for positioning the joint body 10 prepared for vulcanization is a vulcanization mold. As can especially be seen in Fig. 3, the abutment ring 31 of the second collar 19 abuts the end 22 of the bushing member 16 in such a manner that once the snap connection is established said collar cannot be pushed further onto the bushing member 16.

Figs. 8 to 12 illustrate an alternative bushing arrangement which may be used instead of the bushing arrangement illustrated in Figs. 3 to 7. The bushing arrangement of Figs. 8 to 12 is composed of two identical collar bushings 14 and 15; each of these collar bushings consists of a bushing member 16 and 17, respectively, and an integrally manufactured collar 18 and 19, respectively, preferably injection molded from polyamide. The two bushing members 16 and 17 have crown-like configuraiton and include snap-in depressions 24 and 25, respectively, near their ends 22 and 23, respectively, whereas snap-in protrusions 26 and 27, respectively, are provided on the associated collar 18 and 19, respectively. According to Fig. 8 the two bushing members 16 and 17 can be tightly telescoped into each other until the snap-in protrusions 26 snap into the snap-in depressions 25 and the snap-in protrusions 27 into the snap-in depressions 24. In this case, too, a further axial telescoping is prevented in that the abutment rings 30 and 31 of each of the two collar bushings 14 and 15 abut with their axially inner sides the adjacent end 23 and 22, respectively, of the bushing members 17 and 16, respectively.

Figure 13:
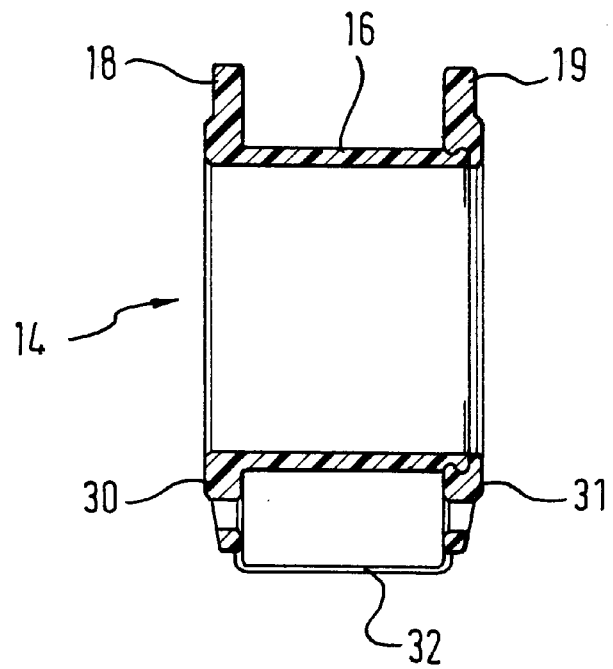
FIG. 13 shows a development of the bushing arrangement shown in FIGS. 3 to 7 in an axial section view corresponding to FIG. 3.
Figure 14:
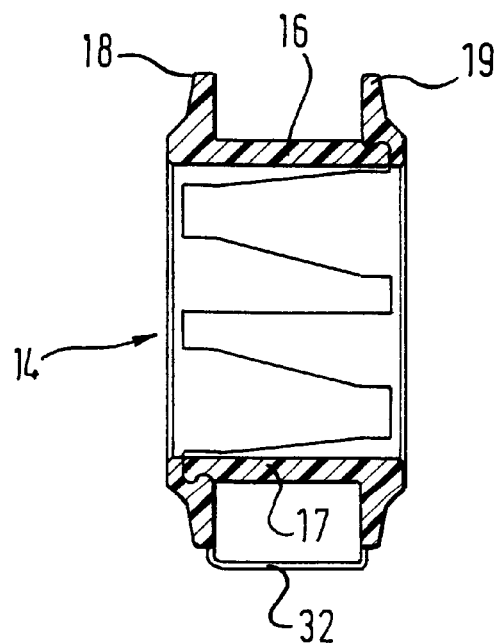
FIG. 14 shows a development of the bushing arrangement shown in FIGS. 8–12 in an axial section view corresponding to FIG. 8.
Figure 15:
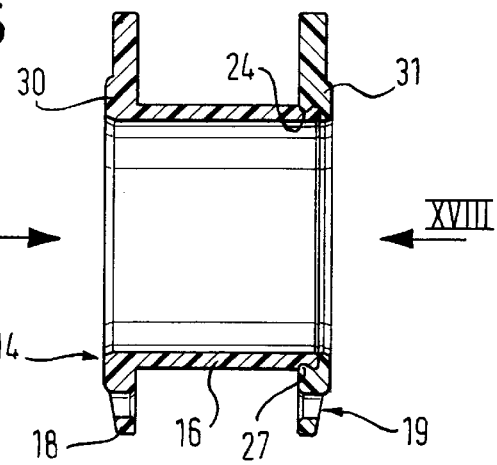
FIG. 15 shows an alternative bushing arrangement in an axial section corresponding to FIG. 3.
Figure 16:
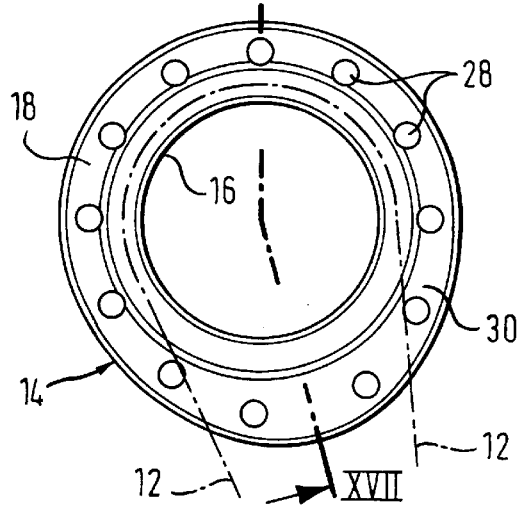
FIG. 16 shows a side view of the collar bushing belonging to the bushing arrangement according to arrow XVI in FIG. 15.
Figure 17:
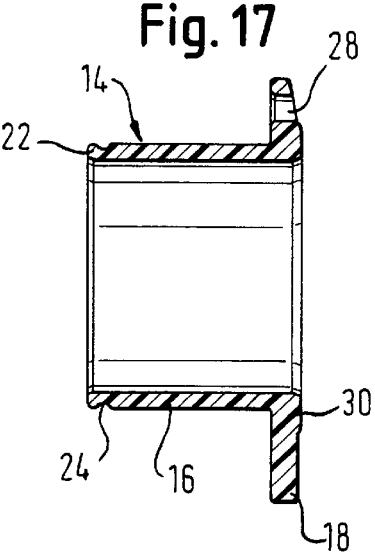
FIG. 17 shows an axial section XVII—XVII of FIG. 16.
Figure 18:
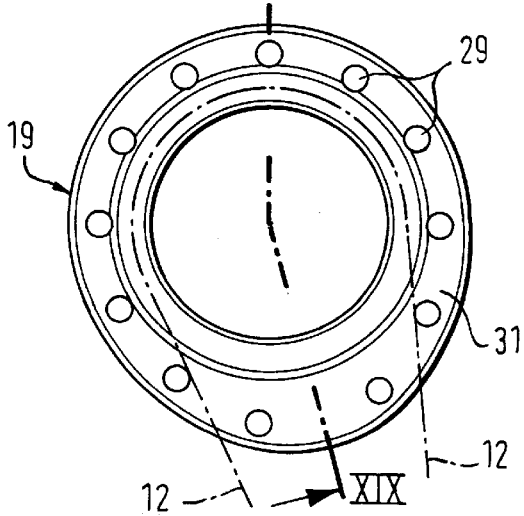
FIG. 18 shows a side view of a collar belonging to the same bushing arrangement according to arrow XVIII in FIG. 15.
Figure 19:
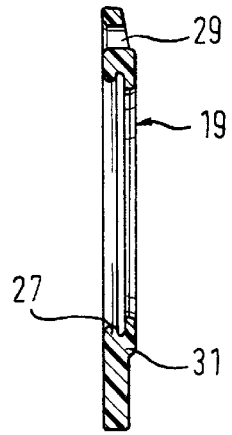
FIG. 19 shows an axial section XIX—XIX of FIG. 18.

The two bushing arrangements illustrated in Figs. 3 to 7 on the one hand and in Figs. 8 to 12 on the other hand may according to Fig. 13 and 14, respectively, be developed further in that the collar bushing 14 comprised of the bushing member 16 and the integral first collar 18 is integrally manufactured, especially injection molded from synthetic material, in a common mold and in one and the same operation with the second collar 19 and with a bracket 32 interconnecting the two collars 18 and 19.

UNITED STATES PATENT AND TRADEMARK OFFICE
CERTIFICATE OF CORRECTION

PATENT NO.    : 6,315,670 B1
DATED         : November 13, 2001
INVENTOR(S)   : Rainer Andrä et al.

It is certified that error appears in the above-identified patent and that said Letters Patent is hereby corrected as shown below:

The bushing arrangement according to Fig. 13 is mounted, like the one illustrated in Figs. 3 to 7, in that the bushing member 16 is passed through the associated loop package 12 and the area of the overlap of two or more loop packages, respectively, and that then the second collar 19 is snapped onto the bushing member 16. During this operation the bracket 32 is laid around a head region of the loop package 12 and the overlapping loop packages, respectively, which results in said head region being additionally secured against slipping to one side before the jacket 20 is vulcanized.

The bushing arrangement according to Fig. 14 is mounted like that shown in Figs. 8 to 12 and in doing so the bracket 32 is laid around the associated loop package 12 and the area of overlap of the associated loop packages, respectively, as described in the previous paragraph.

It applies to all the embodiments illustrated that the components of each bushing arrangement held together by catch or snap connection may additionally be conglutinated or bonded or welded together. This is especially appropriate with the embodiment shown in Figs. 3 to 7 if it is of decisive imoportance that a certain torsional allocation of the two collars 18 and 19 with respect to each other is maintained. Examples to this end are eccentric and/or oblong collars 18 and 19 which have to be oriented differently in response to the orientations of adjacent loop packages 12. In the bushing arrangements according to Figs. 13 and 14 the bracket 32 takes care that a specific torsional allocation of collars 18 and 19 belonging together is easily observed during assembly. --.

Column 4,
Line 31, "according to claim 9" should read -- according to claim 1 --.

Signed and Sealed this

Eighth Day of October, 2002

*Attest:*

*Attesting Officer*

JAMES E. ROGAN
*Director of the United States Patent and Trademark Office*